United States Patent [19]

Levengood

[11] Patent Number: 4,515,526
[45] Date of Patent: May 7, 1985

[54] COOLABLE AIRFOIL FOR A ROTARY MACHINE

[75] Inventor: James L. Levengood, West Hartford, Conn.

[73] Assignee: United Technologies Corporation, Hartford, Conn.

[21] Appl. No.: 334,616

[22] Filed: Dec. 28, 1981

[51] Int. Cl.³ .............................................. F01D 5/18
[52] U.S. Cl. .............................. 416/96 R; 416/97 R; 415/115
[58] Field of Search ........... 415/115; 416/96 A, 96 R, 416/97 A, 97 R

[56] References Cited

U.S. PATENT DOCUMENTS

| | | | |
|---|---|---|---|
| 3,370,829 | 2/1968 | Banthin et al. | 415/115 |
| 3,628,885 | 12/1971 | Sidenstick et al. | 416/96 |
| 3,806,274 | 4/1974 | Moore | 416/96 A |
| 4,173,120 | 11/1979 | Grosjean et al. | 415/115 |

FOREIGN PATENT DOCUMENTS

| | | | |
|---|---|---|---|
| 0034961 | 9/1981 | European Pat. Off. | 416/97 |
| 919855 | 9/1954 | Fed. Rep. of Germany | 416/97 |
| 1033759 | 6/1966 | United Kingdom | 416/97 |
| 1410014 | 10/1975 | United Kingdom | 416/97 |
| 364747 | 3/1973 | U.S.S.R. | 416/97 |

*Primary Examiner*—Samuel Scott
*Assistant Examiner*—Brian J. Bowman
*Attorney, Agent, or Firm*—Gene D. Fleischhauer

[57] ABSTRACT

A coolable airfoil 10 for rotary machines is disclosed. The airfoil has a passage 54 extending spanwisely through the leading edge region 26 of the blade. The passage has a plurality of trip strips 68 canted toward the direction flow. Each trip strip includes a vortex generator integrally formed with the trip strip which is spaced from the wall of the airfoil. In one embodiment, a plurality of trip strips each having an integral vortex generator are disposed in the passageway and at least one of the vortex generators is of greater height than the remaining vortex generators.

8 Claims, 3 Drawing Figures

COOLABLE AIRFOIL FOR A ROTARY MACHINE

DESCRIPTION

1. Technical Field

This invention relates to coolable airfoils used in high temperature rotary machines and more specifically to structure for cooling such airfoils. The concepts disclosed have application to both turbine vanes and turbine blades.

2. Background Art

A rotary machine burns fuel in combustion chambers to provide energy to the machine in the form of hot working medium gases. The hot working medium gases are flowed to the turbine section of the machine. In the turbine section, airfoils from stationary arrays of stator vanes and rotating arrays of rotor blades. These airfoils are employed to direct the flowing gases and to extract energy from the gases. As a result, the airfoils are bathed in a hot working medium gases during operation of the engine causing thermal stresses in the airfoils which affect the structural integrity and fatigue life of the airfoil. These thermal stresses have been a constant source of concern since the advent of high temperature rotary machines, such as gas turbine engines, because of the need to operate the engine at high temperatures to maximize engine efficiency. For example, the airfoils in the turbines of such engines may see temperatures in the working gases as high as 2,500° F. (twenty-five hundred degrees Fahrenheit). The blades and vanes of these engines are typically cooled to preserve the structural integrity and the fatigue life of the airfoil by reducing the level of thermal stresses in the airfoil.

One early approach to airfoil cooling is shown in U.S. Pat. No. 3,171,631 issued to Aspinwall entitled "Turbine Blade". In Aspinwall, cooling air is flowed to the cavity between the suction sidewall and the pressure sidewall of the airfoil and diverted to various locations in the cavity by the use of turning pedestals or vanes. The pedestals also serve as support members for strengthening the blade structure.

As time passed, more sophisticated approaches employing torturous passages were developed as exemplified in the structure shown in U.S. Pat. No. 3,533,712 issued to Kercher entitled "Cooled Vane Structure for High Temperature Turbines". Kercher discloses the use of serpentine passages extending throughout the cavity in the blade to provide tailored cooling to different portions of the airfoil. The airfoil material defining the passages provides the necessary structural support to the airfoil.

Later patents, such as U.S. Pat. No. 4,073,599 issued to Allen et al entitled "Hollow Turbine Blade Tip Closure" disclose the use of intricate cooling passages coupled with other techniques to cool the airfoil. For example, the leading edge region in Allen et al is cooled by impingement cooling followed by the discharge of the cooling air through a spanwisely extending passage in the leading edge region of the blade. The flowing air in the passage also convectively cools the leading edge region as did the passage in Aspinwall.

The cooling of turbine airfoils using intricate cooling passages and film cooling holes alone or in conjunction with trip strips to promote cooling of the leading edge region are the subject of many of the latest patents such as: U.S. Pat. No. 4,177,010 issued to Greaves et al entitled "Cooled Rotor Blade for A Gas Turbine Engine" (film cooling holes); U.S. Pat. No. 4,180,373 issued to Moore et al entitled "Turbine Blade" (film cooling holes and trip strips); U.S. Pat. No. 4,224,011 issued to Dodd et al entitled "Cooled Rotor Blade for A Gas Turbine Engine" (film cooling holes); and U.S. Pat. No. 4,278,400 issued to Yamarik et al entitled "Coolable Rotor Blade" (film cooling holes and trip strips). These blades are typified by large cooling air passages in relation to the thickness of the walls in the leading edge region of the blade.

Recent aerodynamic studies suggest that an elliptical leading edge has advantages in performance during operation of the gas turbine engine. The elliptical leading edge is used in conjunction with an airfoil that has a thinner cross-sectional shape (thickness to chord length) as compared with prior airfoils. Despite the thinness of the profile, a minimum thickness of the walls is required to provide structural support to the airfoil and to enable the airfoil to sustain a certain amount of statistically expected foreign object damage. The result has been the advent of a new airfoil having an elliptical leading edge for aerodynamic purposes and having thicker walls relative to the size of the cooling air passages in comparison to the relationship between the walls and the size of the passages in prior airfoils. In addition, in the interest of fuel efficiency, it is not desirable in certain stages of the turbine to use film cooling for the leading edge region of the airfoil.

Accordingly, scientists and engineers are seeking to develop coolable airfoils for use in high temperature turbines which efficiently use cooling air, which cool adequately the leading edge region of airfoils with narrow passages in comparison to the thickness of the airfoil walls and yet which avoid the discharge of cooling air through film cooling from the leading edge region of the airfoil.

DISCLOSURE OF INVENTION

According to the present invention, a coolable airfoil having a passage for cooling fluid adjacent a wall in the leading edge region includes at least one trip strip extending across the passage which is canted toward the approaching flow and the wall and which has a vortex generator extending from a portion of the trip strip.

A primary feature of the present invention is an airfoil having a cooling passage in the leading edge region of the airfoil. A wall in the leading edge region bounds the passage. A plurality of trip strips extend across the passage and into the leading edge region of the blade. The trip strips are angled with respect to the wall and are canted toward the oncoming flow. At least one trip strip has a vortex generator extending from a portion of the trip strip. The vortex generator is spaced chordwisely from the wall in the leading edge region. In one embodiment, the trip strips extend from the pressure sidewall to the suction sidewall across the leading edge region of the airfoil. In one embodiment, a second trip strip has a vortex generator. The combined height of the second trip strip and vortex generator is greater than the combined height of the first trip strip and vortex generator.

A principal advantage of the present invention is the service life of the airfoil resulting from the thickness of the walls in the leading edge region which protects the airfoil from foreign object damage and the cooling of the thickened walls which prevents undue thermal stress in the walls. Another advantage is the increase in the efficiency of the rotary machine which results from channeling a portion of the cooling flow and causing turbulence in the cooling flow to increase the cooling effectiveness of the flow.

Other features and advantages will be apparent from the specification and claims and from the accompanying drawings which illustrate an embodiment of the invention.

BEST MODE FOR CARRYING OUT THE INVENTION

Figure 1:
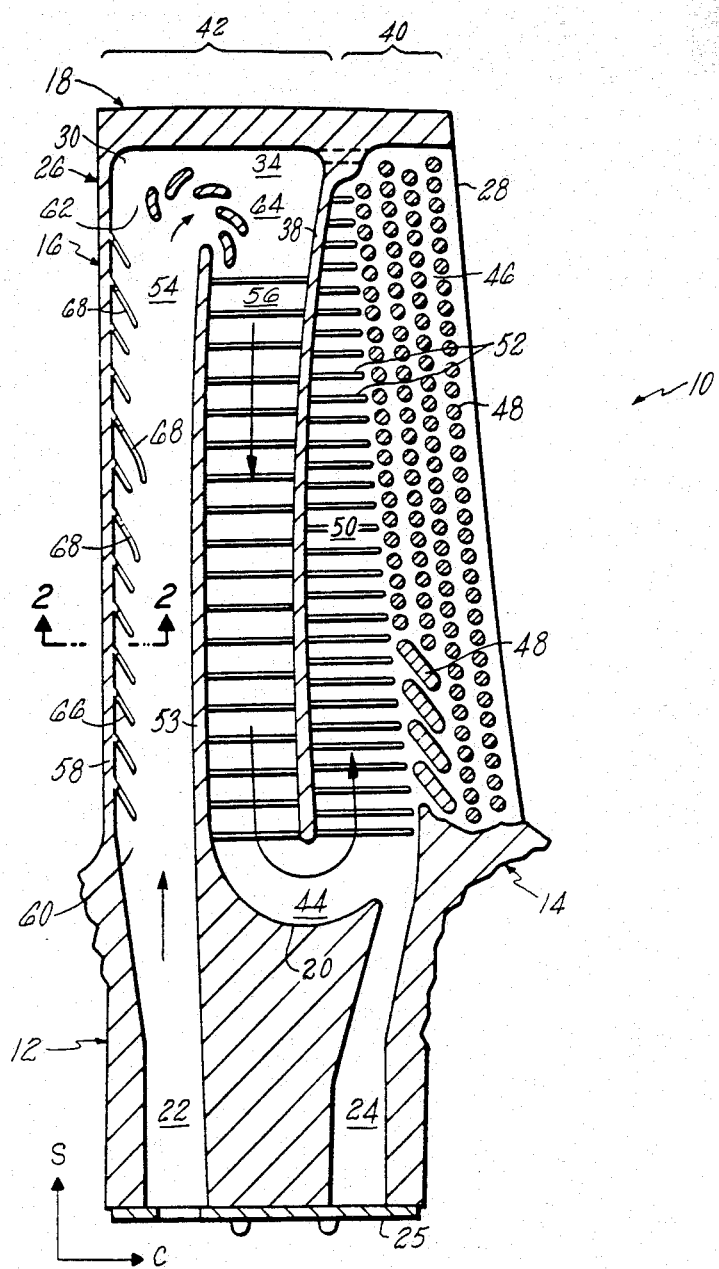
FIG. 1 is a view of a rotor blade partly in section and partly broken away to show the suction sidewall of the rotor blade.

FIG. 1 shows a rotor blade 10 for a rotary machine. The rotor blade has a root section 12, a platform section 14 and an airfoil section 16. The root section is adapted to engage the rotor of a rotary machine. The platform section is adapted to form a portion of the inner wall of the flow path for working medium gases in a rotary machine. The airfoil section is adapted to extend outwardly across the flow path for the working medium gases and has a tip 18 at its most outward end. The rotor blade has reference directions such as the spanwise direction S and the chordwise direction C.

The root section 12 has a chordwisely extending root wall 20. A first duct 22 is in fluid communication through the root wall with a source of cooling air such as a compressor (not shown). A second duct 24 extends through the root wall. A plate 25 extends across the second duct and blocks fluid communication with a source of cooling air (not shown). In an alternate embodiment, the second duct is in fluid communication with the source of cooling air.

The airfoil section 16 has a leading edge 26 and a trailing edge 28. A suction sidewall 30 and a pressure sidewall 32 (partially broken away in FIG. 1 for clarity and shown in FIG. 2) are joined at the leading edge and the trailing edge. The pressure sidewall is spaced from the suction sidewall to form a cavity 34 therebetween. A tip wall 36 and the root wall 20 bound the cavity in the spanwise direction. A first baffle 38 extends in the spanwise direction from the tip wall to divide the cavity into a rear portion 40 and front portion 42. The first baffle is spaced from the root wall leaving a first turning passage 44 therebetween which places the rear portion of the rotor blade in fluid communication with the front portion and with the second duct 24 extending through the root section of the blade. The rear portion of the blade includes a trailing edge region 46. The trailing edge region is in fluid communication with the working medium flow path through a plurality of spaced apart pedestals 48. Each pedestal extends between the suction sidewall and the pressure sidewall to locally block the flow and, with the first baffle, define a spanwisely extending passage 50 for cooling air. A plurality of trip strips 52 are perpendicular to the approaching flow and interfere with the formation of a laminar boundary layer by causing turbulent flow in boundary layer as the flow passes over the trip strips.

A second baffle 53 extends in a spanwise direction from the root wall 20 to divide the front portion 42 of the blade into a first passage 54 and a second passage 56. The first passage is adjacent a third wall 58 in the leading edge region of the blade. The first passage has an upstream end 60 in fluid communication with the first duct 22 and a downstream end 62 in fluid communication through a turning passage 64 with the second passage.

A plurality of first trip strips 66 extend from the suction sidewall 30 across the third wall in the leading edge region to the pressure sidewall 32. These trip strips are of constant height h. The trip strips are canted toward the approaching flow and angled at an acute angle with respect to the third wall. A plurality of second trip strips 68 are canted toward the approaching flow and angled at an acute angle of approximately thirty degrees (30°) with respect to the third wall. It is believed that acute angles lying in a range between twenty-five degrees (25°) and fifty degrees (50°) will prove satisfactory for orienting the trip strips with a range of thirty degrees to forty-five degrees being the range thought to be most satisfactory. Each of the plurality of second trip strips has an end which is curved toward the approaching flow.

Figure 2:
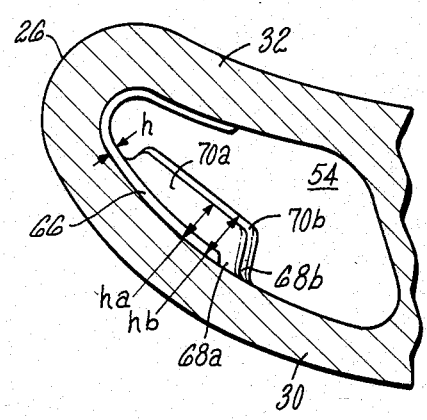
FIG. 2 is a cross-sectional view taken along the lines 2—2 of FIG. 1.

FIG. 2 is a cross-sectional view of a portion of the rotor blade shown in FIG. 1 taken along the lines 2—2 of FIG. 1. The trip strip 66 has a height h and extends along the suction sidewall 30, along the pressure sidewall 32, and across the third wall 58 in the leading edge region 26. A vortex generator 70a is integrally formed with the first trip strip 68a. The vortex generator increases the height of the trip strip. The combined height of the trip strip 68a and vortex generator 70a is a height $h_a$ which is greater than the height h. The trip strip 68b has a vortex generator 70b integrally formed with the second trip strip and increases the height of the trip strip to a height $h_b$ which is greater than the height $h_a$. Each of the vortex generators 70a, 70b is spaced chordwisely from the third wall 58 in the leading edge region. The vortex generator 70b has a chordwisely extending length which is greater than the chordwisely extending length of the vortex generator 70a. Increasing the height and length of the vortex generator increases the capability of the vortex generator to remove heat. Accordingly, the longer, higher vortex generators are used in regions of the airfoil which experience the greatest heat flux.

During operation of the rotary machine, hot working medium gases are flowed over the exterior of the airfoil. Energy in the form of heat is transferred from the hot working medium gases to the leading edge region 26, the suction sidewall 30 and the pressure sidewall 32. Cooling air from the duct 22 is flowed along the leading edge region via the passage 54 to the turning passage 64. As the flow leaves the first passage and moves through the turning vanes, the flow is partially blocked from portions of the airfoil by the turning vanes. By reason of the thinness of the tip region, the blockage of the flow is not accompanied by a severe thermal stress penalty as would be associated with the blockage of such flow in the mid-span region of the airfoil of the blade. The cooling air is flowed through the turn and is flowed via the second passage 56 through the first turning passage 44 to the passage 50 in the rear portion of the blade. The flow is discharged through the spaces between the pedestals 48 in the trailing edge region.

Figure 3:
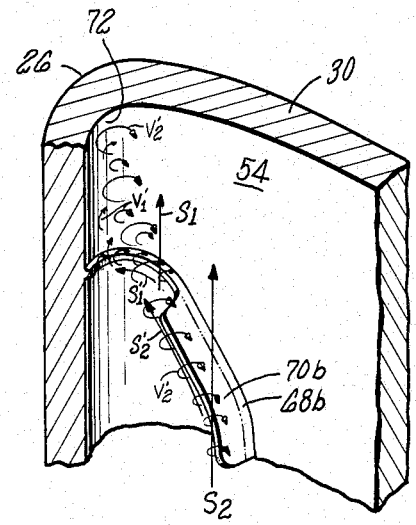
FIG. 3 is a partial perspective view, partly in section and partly broken away, of the leading edge region shown in FIG. 2 to schematically illustrate a portion of the flow in the leading edge region of the rotor blade.

FIG. 3 schematically illustrates the interaction between two streamlines $S_1$ and $S_2$ of the cooling air as the cooling air is flowed through the passage 54 and over the trip strip 68b and the vortex generator 70b in the mid-span region of the blade. The stream-lines $S_1$ and $S_2$ are adjacent the suction surface of the airfoil and are not blocked from movement along the passage. As the streamline $S_1$ of the flow passes over the trip strip 68b, a small portion of the flow is diverted toward the leading edge region as shown by the line $S_1'$. In addition, small vortices are formed on the upstream side of the trip strip as the streamline $S_1$ passes over the trip strip. The vortices are shed with a component of velocity extending in the chordwise direction by reason of the angled orientation of the trip strips with respect to the flow and the wall 58. The chordwise component of velocity causes the small vortices to move toward the leading edge region and into the leading edge region, as shown by the vortices $V_1'$. These vortices cause turbulence in the boundary layer adjacent the suction surface of the airfoil. The streamline $S_2$ is also adjacent to the suction surface of the airfoil. As the streamline $S_2$ passes over the vortex generator a larger portion of the flow along the streamline is diverted toward the leading edge region as shown by the line $S_2'$. In addition, as the streamline $S_2$ passes over the vortex generator, vortices of a size much greater than the small vortices formed at the trip strip are formed on the upstream side of the vortex generator. By reason of the angled nature of the vortex generator, these large vortices are shed with a component of velocity extending in the chordwise direction and in the spanwise direction. The chordwise component of velocity causes these large vortices to move into the leading edge region and along the leading edge region scrubbing the surface 72 of the wall 58 in the leading edge region of the airfoil. The large vortices force cooler air from the main portion of the flow into the boundary layer in the leading edge region. Thus the action of the small vortices is greatly intensified by the action of the large vortices which are of longer duration than the small vortices and which interact with the small vortices, cooling the air in the boundary layer, increasing the turbulent velocities in the boundary layer, and increasing heat transfer between the walls of the airfoil and the cooling air in the leading edge region.

Although the invention has been shown and described with respect to preferred embodiments thereof, it should be understood by those skilled in the art that various changes and omissions in the form and detail thereof may be made therein without departing from the spirit and the scope of the invention.

I claim:

1. In a coolable airfoil adapted for use in a rotary machine of the type having a cooling air passage and a wall in the leading edge region bounding the passage for cooling air, the improvement which comprises:
   at least one trip strip which extends across the passage and from the wall in the leading edge region which is canted towards the approaching flow and which forms an acute angle with respect to the wall, the trip strip having a vortex generator integrally formed with the trip strip which increases the height of the strip, which permits flow over the vortex generator and which is spaced chordwisely from the wall in the leading edge region to permit flow by the vortex generator over the trip strip.

2. The coolable airfoil as claimed in claim 1 wherein said trip strip and vortex generator is a first trip strip and vortex generator which has a height $h_a$ and wherein the airfoil further has a second trip strip which extends across the passage and from the wall in the leading edge region, wherein the second trip strip is canted towards the approaching flow and forms an acute angle with respect to the wall, the second trip strip having a vortex generator integrally formed with the trip strip which increases the height of the trip strip and which is spaced in the chordwise direction from the wall in the leading edge region, wherein the height of the second trip strip and vortex generator is $h_b$ and is greater than the height of the first strip and vortex generator $h_a$ ($h_b > h_a$).

3. The coolable airfoil of claim 2 wherein the height of the first trip strip is h, and the height $h_a$ of the first trip strip and vortex generator is greater than or equal to twice the height of the trip strip ($h_a \geq 2h$).

4. The coolable airfoil as claimed in claim 2 wherein the vortex generator of the first trip strip has a first chordwise length and the vortex generator of the second trip strip has a second chordwise length which is greater than the first chordwise length.

5. The coolable airfoil of claims 1, 2, 3 or 4 wherein one of said trip strips and integral vortex generators has an end which is curved toward the approaching flow such that the trip strip and vortex generator are curved toward the approaching flow.

6. The coolable airfoil of claim 1 wherein the acute angle between the trip strip and the wall in the leading edge region is thirty degrees (30°).

7. The coolable airfoil of claim 1 wherein the acute angle between the trip strip and the wall in the leading edge region lies in a range between twenty-five degrees (25°) and fifty degrees (50°).

8. The coolable airfoil of claim 5 wherein said airfoil has a suction sidewall, said wall is said suction sidewall, wherein the airfoil has a pressure sidewall, and wherein at least one of said trip strips extends from the suction sidewall and pressure sidewall of the passage and wherein said vortex generator extends from the portion of the trip strip on the suction sidewall of the passage.

* * * * *